March 28, 1944.  O. E. SORENSEN  2,345,312
WORK POSITIONING FIXTURE
Filed Sept. 12, 1939  2 Sheets-Sheet 1
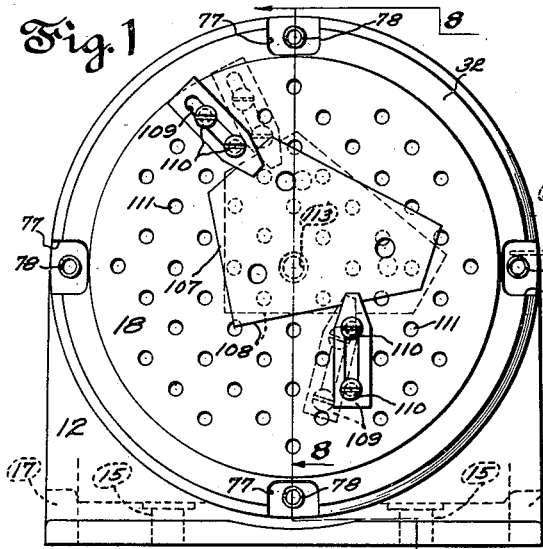
Fig.1
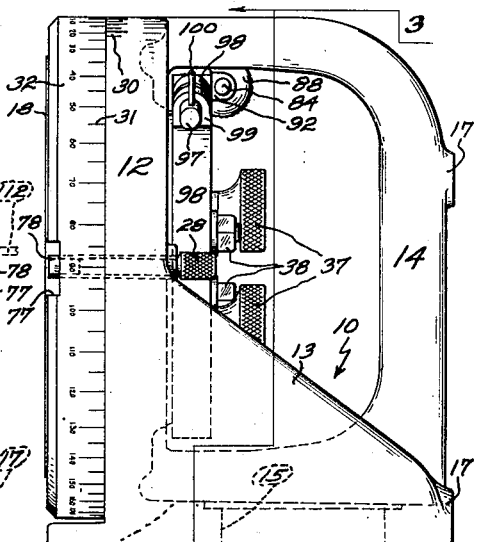
Fig.2
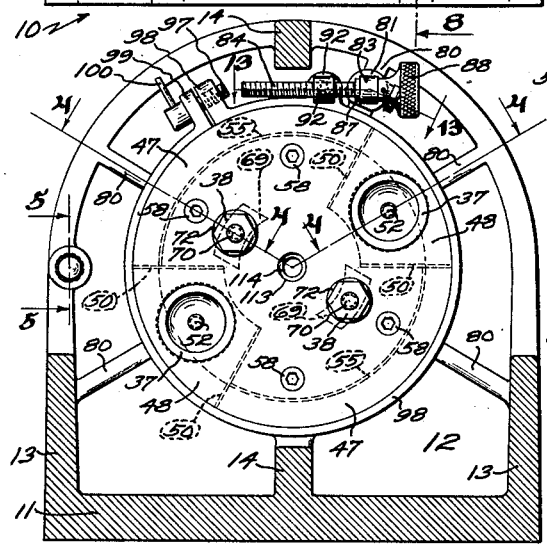
Fig.3
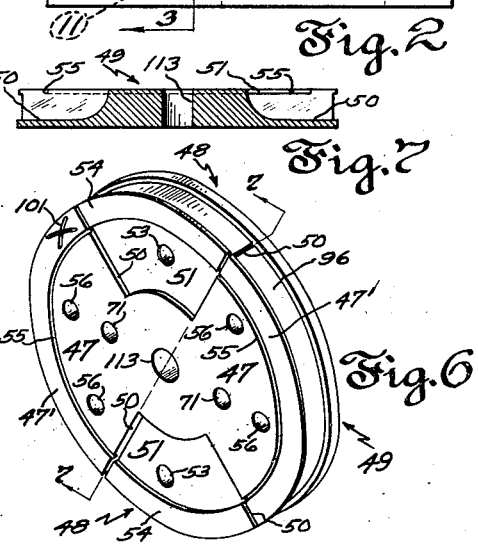
Fig.6
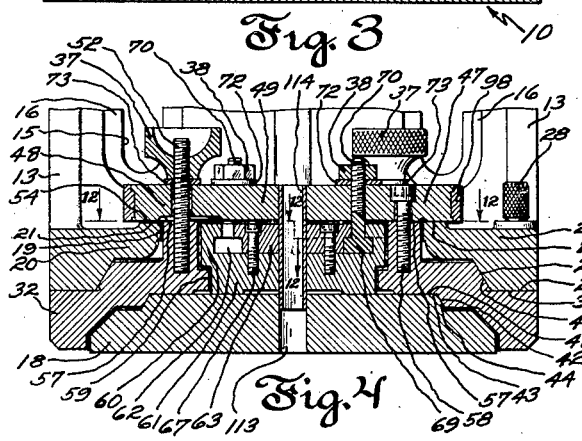
Fig.4
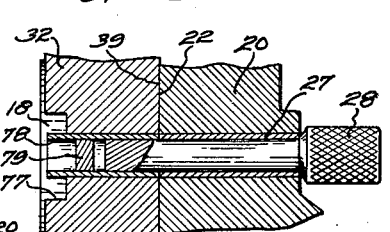
Fig.5
Fig.7
INVENTOR
Otto E. Sorensen
BY
ATTORNEY

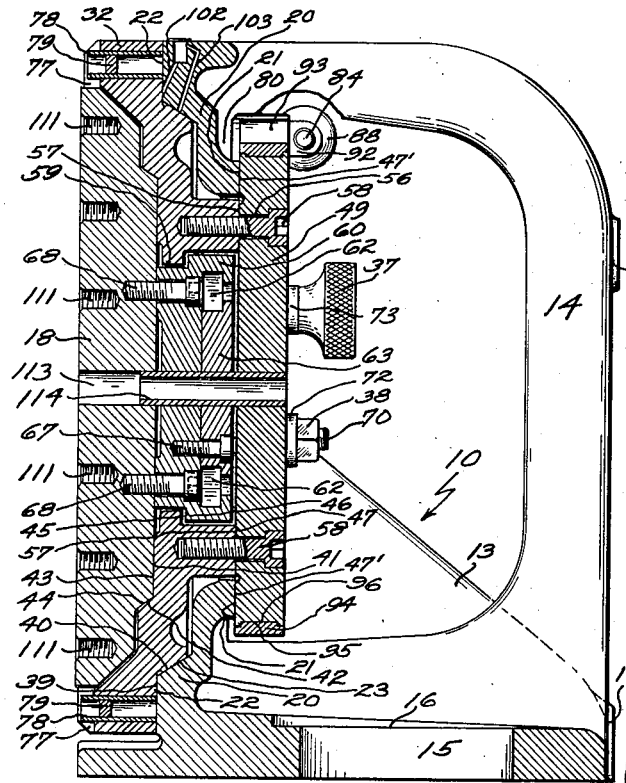

Patented Mar. 28, 1944

2,345,312

UNITED STATES PATENT OFFICE 2,345,312

WORK POSITIONING FIXTURE

Otto E. Sorensen, Bridgeport, Conn.

Application September 12, 1939, Serial No. 294,489

37 Claims. (Cl. 33—174)

This invention relates to precision devices for firmly holding a work piece at selectively variable angles of inclination relative to the horizontal while the work is being measured or machined or while there is being located and scribed upon its surface suitable center lines or other layout marks to serve as guide for the later drilling or machining thereof. Such devices are variously known as layout fixtures, measuring fixtures, or "sine-bar" fixtures.

One object of the present improvements is to provide a device or fixture capable of serving the above purposes with greater convenience, accuracy and dependability than has heretofore been possible.

Another object is to enable a work piece first to be clamped in arbitrary angular relation to the horizontal against a flat upright supporting face plate of the fixture and thereafter to be swung in unison with such face plate about a horizontal axis into corrected true alignment with the horizontal by manipulation of the face plate rather than by manipulation of the work piece itself. This avoids tedious and time consuming tests and readjustments which have heretofore been considered necessary for accurately positioning the work piece with respect to the horizontal as a part of the operation of strapping or securing it in place against the vertical face plate.

A related object is to enable the pre-secured work piece in unison with the face plate which supports it thus to be swung into accurate selective relationships to the horizontal while at the same time preserving to a rotatable carrier for said face plate an accurate normal or zero position in relation to a stationary supporting base structure, so that after the work piece has first been fastened in arbitrary position on the face plate and then swung together therewith into desired relation to the horizontal, the work piece, face plate, and carrier may all be turned in unison an unrestricted number of accurately measurable degrees away from such zero position about an axis which remains fixed in relation to some surface plate or the like on which the stationary base structure may stand.

It is a further object to equip the rotatable carrier for the face plate with means for very accurately determining and measuring its unlimited degree of displacement from the zero position by the "sine-bar" method, and also by reference to some suitable scale of graduations including preferably a vernier. Hence I may appropriately refer to such carrier as an angle measuring wheel.

Heretofore, so far as I am aware, no independent and unrestricted rotative setting of two relatively movable parts jointly contributing to or associated with the support of a work piece has been provided in a fixture of this kind, nor in a way to preserve a fixed axis of rotative shifting for all of the parts, nor in a way to preserve the zero setting of a carrier ring or angle measuring wheel relative to a support base while a work carrying face plate is first rotatably shifted in relation to such carrier ring.

The present invention includes within its scope important devices and expedients which have been discovered to be necessary or desirable for accomplishing the described objectives and which are pointed out in greater particular in the following description of an illustrative embodiment of the improvements in which description reference is had to the accompanying drawings, wherein:

Fig. 1 is a front view of a measuring and layout fixture embodying the present improvements showing an example of work piece clamped thereon.

Fig. 2 is a side elevation looking from the right at Fig. 1.

Fig. 3 is a rear view taken in section on the planes 3—3—3 in Fig. 2.

Fig. 4 is a fragmentary view taken in section on the planes 4—4—4—4 in Fig. 3 looking in the direction of the arrows.

Fig. 5 is an enlarged fragmentary view taken on the plane 5—5 in Fig. 3 looking in the direction of the arrows.

Fig. 6 is a perspective view of the clamp plate detached.

Fig. 7 is a view taken in diametrical cross section on the plane indicated by arrows 7—7 in Fig. 6.

Fig. 8 is an enlarged view taken in vertical section on the planes 8—8—8 in Fig. 1 looking in the direction of the arrows.

Fig. 9 is a fragmentary isometric view of half of the angle base shown as sectional on a central vertical plane.

Fig. 10 is a corresponding isometric view of half of the carrier ring shown as sectioned on a central vertical plane.

Fig. 11 is a corresponding isometric view of half of the face plate shown as sectioned on a central vertical plane.

Fig. 12 is a view taken in section on the planes 12—12—12—12 in Fig. 4 looking in the direction of the arrows.

Fig. 13 is a view taken in section on the planes

13—13 in Fig. 3 looking in the direction of the arrows.

Fig. 14 is a fragmentary plan view of the adjoining top surfaces of face plate and carrier ring.

The support base of my improved measuring, layout and sine-bar fixture herein illustrated as an angle base is designated as a whole by 10 and consists of a slotted base wall 11, the upright apertured support wall 12, the bracing or side walls 13, and the centrally disposed rigid bail-shaped handle 14. Base wall 11 is provided with elongated slots 15 and is surfaced thereabout at 16 to seat washers and holding nuts for fastening bolts (not shown) which may extend upwardly through slots 15 from their usual form of anchorage in the T-shaped grooves of any machine tool work carriage to which the angle base may thus be rigidly fastened. When used merely for measuring or laying out work at the bench, as for instance when resting or standing stably on a surface plate of greater area than base wall 11, slots 15 need not of course be used. Under the latter circumstances the foot pads 17 will when desired provide a true three-point support for the angle base to rest or stand stably upon in a manner disposing the face plate 18 in horizontal instead of vertical position. Wall 12 of the angle base contains a large circular aperture 19 and the portion of wall 12 which borders about aperture 19 possess the cross sectional shape most clearly shown at 20 in Figs. 4, 8 and 9. In this aperture surrounding portion of wall 12 there are accurately machined, and preferably scraped to a surface finish of extreme smoothness, the rearmost annular thrust face 21, the frontmost annular thrust face 22, and the conical seat 23. Also at one point in the portion 20 of wall 12 there is provided the tubular bushing 27 which serves as slide bearing for the lock plug 28 as best shown in Figs. 3 and 5. At the top front of angle base 10 there is placed the zero mark 29 and associated vernier graduations 30 adapted, as shown in Fig. 14, to cooperate with angle measuring graduations 31 marked on the peripheral face of a carrier ring 32 which graduations are also shown in Fig. 10.

A compound work holding structure including face plate 18 and carrier ring 32, sometimes herein referred to as an angle measuring wheel, is supported by and rotatable in relation to the upright wall 12 of angle base 10. In general, all parts of this compound structure which are permanently fixed to rotate in unison with carrier ring 32 are adapted to be clamped at times by the action of the hand knobs 37 in a manner to be locked against rotary movement relative to angle base 10. All parts of said compound structure which are permanently fixed to rotate in unison with face plate 18 are adapted to be clamped at times, and independently of the clamping action of knobs 37, by the action of nuts 38 in a manner to be locked against rotary movement relative to carrier ring 32. It will be seen from Figs. 4 and 8 that carrier ring 32 is rotatably supported through its bearing engagement with angle base 10, while face plate 18 is supported directly through its bearing engagement with carrier ring 32 and indirectly through the bearing engagement of the latter with the angle base. Certain relationships of fits and shapes hereinafter explained afford at times fixed, and at other times freely rotatable, support of the above mentioned parts relatively to one another and to the angle base. Thus there are present in my improved construction bearing means rotatably supporting the plate and ring or wheel constructed and arranged to confine the same to rotary movement both relatively and in unison about a common axis which may be vertical or horizontal.

For mating with the hereinbefore described frontmost thrust face 22 and conical seat 23, carrier ring 32 is provided with a rearwardly disposed thrust face 39 and conical face 40. This carrier ring is also provided with a forwardly disposed thrust face 41 and conical seat 42. Received against said thrust face 41 is the rearwardly disposed thrust face 43 on face plate 18 which plate is also provided with the conical face 44 to mate with the said conical seat 42 on the carrier ring.

Pressure may be brought to bear between the engaged thrust surfaces 22, 39 and between the conical surfaces 23, 40, when desired, by means which make use of yieldable segmental portions 48 of the clamp disc 49, best shown in Fig. 6. Resilient yielding of segmental portions 48 is made possible by two pairs of saw cuts 50 which are shown in Figs. 6 and 7 as radially disposed. Between the saw cuts of each pair the thickness of the clamp disc is somewhat reduced in the segmental areas 51 for so reducing the rigidity of the clamp disc 49 in its segmental portions 48 that these portions may be sprung slightly forward by tightening up on hand knobs 37.

These knobs have free threaded engagement with studs 52 which latter are fixed tightly in carrier ring 32 and pass through clearance holes 53 respectively in clamp disc 49. Those segmental portions 47 of disc 49 at the same radius as areas 51, but which lie circumferentially between said areas and are not reduced in thickness, are permanently and fixedly held against the rearmost annular face 57 of carrier ring 32 by means of four or more bolts 58 preferably provided with socket type heads to receive a wrench which will be used only for the purpose of disassembling the fixture.

Between the clamp disc 49 and an inwardly projecting annular retaining shoulder 59 on the carrier ring 32, there is loosely imprisoned the larger portion 60 of a cylindrical retaining or trunnion-like block 61 at whose rearmost face is provided the annular groove 62 of T-shape in cross section and whose radially inward walls are for convenience formed by a separate smaller cylindrical block 63 which is permanently and fixedly secured to the larger cylindrical block 61 by holding screws 67. The larger cylindrical block 61 is in turn fixedly secured to the face plate 18 by holding screws 68 so that in effect, and for all purposes of operation, the blocks 61 and 63 together with face plate 18 comprise a rigidly assembled unitary structure which might as well be an integral piece or part except for the problems of assemblage. The T-grooves 62 accommodate the heads 69 of T-bolts 70 whose shanks extend through clearance holes 71 respectively in the clamp disc 49 and receive at the rear of the latter the before described clamp nuts 38. Washers 72 may be used to advantage under the nuts 38, while similar washers 73 may be used under the hand knobs 37.

The clearance between rear bearing surface 45 on carrier flange 59 and shoulder bearing surface 46 on block 60 is exaggerated in the drawings for the purpose of distinguishing between those surfaces which do and do not bear the clamping thrust exerted for locking the parts against rotation. In actual practice this clearance will be only that required to free carrier 32 and face plate 18 for relative rotative movement without axial looseness when clamping nuts 70 are eased up. In like manner, clearance sufficient to permit free relative rotation between carrier 32 and angle base 10 but not sufficient to produce axial looseness therebetween exists at all times between rear bearing surface 21 of the angle base 10 and front bearing surface 47' of the rigid segments 47 of clamp disc 49. Such clearance is not shown in the drawings however because clamp disc 49 does not need to move bodily in an axial direction when clamp knobs 37 are set up or eased off since only the springable segment portions 51 of the clamp move for clamping purposes.

Further details of the construction consist in four niches 77 sunk in the front face of carrier ring 32 from the periphery thereof and centrally of which there projects forwardly from the floor of each niche, but not beyond the frontmost face of carrier ring 32, the end of a hollow sine plug 78 variously termed in this art a button, pin or stud, its function for mere measuring not depending on whether or not a portion of its length is embedded in a carrier or seated in a hole. In the construction shown, each plug 78 comprises a bushing fixedly mounted in a hole extending through the marginal portion of the carrier ring and opens at the rear thereof at proper radial distance from the ring center to register accurately with the front end of the hereinbefore described slide bearing bushing 27 for lock plug 28. The sine plugs may be spaced 90 degrees apart and the center of one of them will preferably coincide on the circle with the zero mark of the scale of graduations 31. To keep dirt and foreign substances out of the hollow in sine plug 78 which is receptive to lock plug 28, a stopper plug 79 is lodged fixedly in place within the hollow sine plug 78 as shown in Fig. 5.

For providing a final micrometer adjustment of the clamp disc 49, and thereby of the carrier ring 32 and face plate 18 relative to the angle base 10, one of the reinforcing ribs 80 of the angle base is provided with a rearwardly extending boss 81 which is bored from the rear to receive the cylindrical shank 82 of a hinge stud whose head affords rotative bearing and axial thrust for an adjustor screw 84. The latter carries the fixed collar 87 together with the thumb button 88 secured by a tapered pin 89. The shank 82 of the hinge stud is free to rotate in boss 81 and is retained therein by means of its circular groove 90 with which the inner end of the retaining screw 91 engages. Adjustor screw 84 has threaded engagement with the head of a stud 92 which pivotally engages with a lug 93 rigid with the split brake band 94. On the interior surface of this brake band is formed an annular tongue 95 which engages with the annular groove 96 formed in the periphery of clamp disc 49. For loosening and tightening brake band 94 about clamp disc 49, a draw bolt 97 is provided having threaded engagement with a lug 98 rigid with one end of the split brake band and passes through a clearance hole in a companion lug 99 rigid with opposite adjacent end of said band. Draw bolt 97 has the radially extending handle pin 100 for conveniently turning it to tighten and loosen the brake band.

Fig. 6 shows that holes 56 accommodate the bolts 58, respectively, and also indicates the cross grooves 101 for picking up and spreading oil which may be introduced between bearing surfaces 21 and 54 in any suitable way. Fig. 6 also shows segmental grooves 55 in clamp plate 49 which overlie the circumferential joint between the rearwardly disposed surfaces 21 of the angle base and 57 of carrier ring 32 and make certain that clamp plate surface 47 will not contact with angle base surface 21. Figs. 2, 4 and 5 show that the front of face plate 18 projects slightly forward of the frontmost surface of carrier ring 32.

An expedient for avoiding the resistance which trapped air may offer to entrance of oil between bearings surfaces is illustrated in Fig. 8 where the bearing surfaces 22, 39 and 23, 40 are lubricated through an oil passageway 102 which is relieved from back pressure of trapped air by the auxiliary passage 103.

While there are many uses to which the fixture of these improvements may be put such as to hold work firmly in desired angular relations while it is being supported vertically or horizontally and operated upon by a machine tool such as a milling or grinding machine, shaper or the like, its operation will be explained for measuring or scribing layout lines upon the template 107 which already possesses one straight edge 108 and three holes and various other angularly related edges. Initially the template or work object or work piece 107 will be clamped against the upright face plate 18 in its arbitrary full line position by slotted straps 109 overhanging the edges of the template and drawn toward the face plate 18 by screws 110 engaging any of tapped holes 111 in the face plate. At this time the carrier ring or measuring wheel 32 will be fastened rotatively in normal position by lock plug 28 positioned as in Figs. 1, 2 and 5, and hand knobs 37 as well as clamp nuts 38 may be either loose or tight. After screws 110 have been tightly set up without regard to the angular position of the edge 108 of work piece 107 and with carrier ring 32 still locked at zero position, the work piece together with face plate 18 is adjustively rotated relative to carrier ring 32 until by test trials by means of a height gauge partially indicated at 112 and which may stand on the same surface plate (not shown) upon which rests angle base 10, the template edge 108 becomes exactly horizontal so that the parts carried by face plate 18 occupy their broken line positions in Fig. 1. Clamp nuts 38 must be loose in order to permit this, but they may now be tightened so as to draw the cylindrical block 61—63 rearward against clamp plate 49. The face plate surfaces 43 and 44 are drawn tightly and respectively against the carrier ring surfaces 41 and 42, while 46 is drawn tightly against 45 causing clamping which securely fastens the face plate in fixed rotative relation to the carrier ring, the latter remaining locked by plug 28 in accurate zero position in relation to the angle base so that the zero marks on both carrier ring and angle base are accurately in register.

The lock plug 28 is now withdrawn toward the right in Fig. 5 until it is clear of the hollow sine plug 78 and thus frees the carrier ring 32 for adjustive rotation in relation to the angle base. Any degree of angular displacement of ring 32 from zero position may now be known with fair precision by the graduations 31 on carrier ring 32 in conjunction with the vernier scale 30. Any degree of such angular displacement may be known with absolute precision by measuring the respective heights of diametrically opposite sine plugs 78 from the surface plate (not shown), upon which the angle base 10 may stand, by use of the height gauge 112 and by computing the angle denoted by their height differential in well known manner.

So called sine bars have most commonly been equipped with a single sine plug, or with two sine plugs in diametrically opposite relation for engagement by the contact finger, as 112, of a height gauge, and this has at times necessitated the measuring of the height of such plugs above the surface plate when both such plugs are nearer to a vertical line passing through the axis of work adjusting rotation than they are to a horizontal line passing through such axis. It is well known that angles can be determined more accurately by trigonometric computation when the sine plug employed is nearer the horizontal than the vertical position. Hence the proposal in these improvements to space sine plugs 78 ninety degrees apart on a common circle having its center at the common axis of rotation of ring 32 and base plate 18 insures that one or another of the sine plugs 78 shall always be as near or nearer to horizontal position than it is to vertical position thus always placing one plug to be measured within the most favorable quadrant for accurate trigonometric computation.

According to these improvements the operator is relieved of the exacting and tedious task of originally so fastening the work piece upon the face plate by means of straps 109 that its lower edge 108 will initially be exactly horizontal, and the corrective turning of the work piece in unison with the face plate from full line to broken line position requires no disturbance of the starting or zero position of carrier ring 32. Now however, with hand knobs 37 loosened and lock plug 28 retracted, the work piece, face plate and carrier ring in unison may be adjustively rotated to any desired angle. At each 90 degree angle of displacement from zero position, carrier ring 32 can again be positively locked in relation to the angle base by reinserting plug 28 in whatever hollow sine plug 78 is in register with bushing 27. At any angle intermediate such ranges of 90 degrees displacement from zero, the carrier ring 32 may be firmly fastened to the angle base by tightening hand knobs 37. This springs the clamp disc segments 48 forward and forces their surfaces 54 against angle base surface 21 at the same time drawing carrier ring bearing surfaces 39 and 40 rearward and respectively against angle base surfaces 22 and 23 so that the carrier ring is firmly fastened against rotation relative to the angle base, and the work piece may be securely held for measurement or layout work at any angle desired.

In the operations above described it is assumed that the draw bolt 97 on brake band 94 has remained loosened whence the clamp disc 49 is free to turn unhindered within the brake band. When it is desired to effect a particularly nice control of the rotative movement of the carrier ring 32 as in the final stages of its adjustment as sensitively measured by the application of a height gauge to one of the sine plugs, an approximate rotative positioning of the carrier ring is first accomplished after which the draw bolt 97 is tightened causing brake band 94 lockingly to clamp the periphery of disc 49. When this is done, turning of the adjustor screw 84 by means of its operating head 88 shifts the rotative position of the entire brake band together with the carrier ring 32 to very finely controllable degrees.

At least two important advantages are attributable to the double pairs of conical bearing surfaces 23, 40 and 42, 44. First they serve as a positively true centering device to assure absolute coaxial fixity and concentricity of the face plate, carrier ring and angle base aperture 19 at all times (and without the necessity of relying upon cylindrical surface fits). Secondly, they provide bearings of a character permitting cleaning, or if necessary re-surfacing, after wear or abuse in service. While sine plugs are employed, it will be observed that they are protected by the niches in which they are housed, these niches giving ample room for the entrance of a height gauge finger into surface contact with the sine plug. While not at all necessary to the functioning of the fixture as described, the central axial hole 113 is capable of receiving a plug to help centralize certain kinds of work or for measuring and making use of the height of the axis of rotation in trigonometric computations. This hole may or need not be provided with the bushing 114 which in any case does not function to hold the face plate or the carrier ring in concentric relationship.

The term sine plug as used in the appended claims will be understood to be inclusive of so-called sine pins, sine studs or sine buttons as these terms are interchangeably used in the art.

Many departures from the exact embodiments of the invention herein illustrated and described will be suggested to workers in this art by the disclosure hereof. The following claims are intended to cover all equivalents and substitutes for the exact parts and arrangements disclosed which fall fairly within their terms:

I claim:

1. A measuring and layout device or the like for firmly holding a work object in selectable differing positions, embodying in combination, a support base having a planar bottom on which said device may stably stand, a rotatable carrier, a rotatable face plate supported by said carrier, holding means to fasten said work object in arbitrary positions to said face plate, bearing means supporting said plate and carrier constructed and arranged to confine the same to rotary movement relatively to each other and also in unison about a common axis, and fastening means constructed and arranged releasably to hold said plate in fixed rotative relation to said carrier.

2. A measuring and layout device or the like for temporarily and firmly holding a work object in variable positions, embodying in combination, a support base having a planar bottom on which said device may stably stand, a rotatable measuring wheel, a rotatable face plate equipped to receive and fixedly hold a work object in arbitrary positions thereon, bearing means rotatably supporting said plate and wheel constructed and arranged to confine the same to rotary movement both relatively and in unison about a common axis, and means constructed and arranged to be operative independently of said base to fasten said plate releasably in fixed rotative relation to said wheel while said plate and wheel both remain free to be rotated in relation to said base.

3. A measuring and layout device or the like for firmly holding a work object in selectable differing positions, embodying in combination, a support base having a planar bottom on which said device may stably stand, a rotatable carrier, a rotatable face plate supported by said carrier, holding means to fasten said work object in arbitrary positions to said face plate, bearing means supporting said plate and carrier constructed and arranged to confine the same to rotary movement relatively to each other and also in unison about a common axis parallel with the plane of said bottom of said base, and fastening means constructed and arranged releasably to hold said plate in fixed rotative relation to said carrier.

4. A work piece measuring and testing fixture embodying in combination, a base structure presenting an upright wall, a carrier supported by said wall in a manner to be adjustably rotated about a fixed axis relative thereto, a face plate having instrumentalities to fasten a work piece in arbitrary positions thereagainst and supported by said carrier in a manner to be adjustably rotated about said axis relative to said carrier and relative to said wall, fastening means constructed and arranged releasably to restrain said carrier from rotation relative to said wall while permitting rotation of said face plate relative to said carrier so that the work piece after being fastened to said face plate may be swung in unison therewith about said axis to a desired initial position, and additional fastening means constructed and arranged releasably to restrain said face plate from rotation relative to said carrier while permitting rotation of said carrier relative to said wall so that the work piece and face plate may be swung in unison with said carrier relative to said wall and away from said initial position to selective extents measurable by the degree of rotary movement of said carrier relative to said wall.

5. A measuring and layout device or the like for temporarily and firmly holding a work object in variable positions, embodying in combination, a support base having a planar bottom on which said device may stably rest, a rotatable carrier, a rotatable face plate supported by said carrier equipped to receive and fixedly hold a work object in arbitrary positions thereon, bearing means rotatably supporting said plate and carrier constructed and arranged to confine the same to rotary movement both relatively and in unison about a common axis angularly displaced from perpendicular relation to said bottom of said base, and means constructed and arranged releasably to fasten said plate in fixed rotative relation to said carrier.

6. A measuring and layout device as defined in claim 5, in which the said carrier and the said support base are provided with cooperative graduation and index marks for measuring relative angular displacement therebetween, together with sine plugs projecting in fixed relation to said carrier.

7. A measuring and layout device for temporarily holding a work object, embodying in combination, a support base having a planar bottom on which said device may stably stand, a rotatable carrier, a rotatable face plate supported by said carrier equipped to receive and fixedly hold a work object in arbitrary positions thereon, bearing means rotatably supporting said plate and carrier constructed and arranged to confine the same to rotary movement both relatively and in unison about a common axis angularly displaced from perpendicular relation to said bottom of said base, means constructed and arranged releasably to fasten said carrier in fixed rotative relation to said support base, and separate means constructed and arranged releasably to fasten said plate in fixed rotative relation to said carrier.

8. A measuring and layout device as defined in claim 7, in which the said carrier and the said angle base are provided with cooperative graduation and index marks for measuring relative angular displacement therebetween, together with sine plugs projecting in fixed relation to said carrier.

9. A work piece measuring and testing fixture embodying in combination, a base structure presenting an upright wall, a carrier supported by said wall in a manner to be adjustably rotated about a given axis relative thereto, a face plate having instrumentalities to fasten a work piece in arbitrary positions thereagainst and supported by said carrier in a manner to be adjustably rotated about said axis relative to said carrier and relative to said wall, universal fastening means constructed and arranged releasably to restrain said carrier from rotation in an unlimited number of positions relative to said wall while permitting rotation of said face plate relative to said carrier so that the work piece after being fastened to said face plate may be swung in unison therewith about said axis to a desired initial position, and additional fastening means constructed and arranged releasably to restrain said face plate from rotation relative to said carrier while permitting rotation of said carrier relative to said wall so that the work piece and face plate may be swung in unison with said carrier relative to said wall and away from said initial position to selective extents measurable by the degree of rotary movement of said carrier relative to said wall.

10. A measuring and layout device or the like for firmly holding a work object in selectable differing positions, embodying in combination, a support base having a planar bottom, a rotatable carrier, a rotatable face plate supported by said carrier, holding means to fasten said work object in arbitrary positions to said face plate, bearing means supporting said plate and carrier constructed and arranged to confine the same to rotary movement relatively to each other and also in unison about a common axis parallel with the plane of said bottom of said base, and fastening means constructed and arranged releasably to hold said plate in fixed rotative relation to said carrier, together with means constructed and arranged releasably to fasten said carrier in fixed rotative relation to said support base.

11. A measuring and layout device or the like for holding a work object in selectable differing positions relative to a support base, embodying the combination with a support base having a planar bottom on which said layout device is adapted stably to stand, rotor bearing means on said base, a compound movable structure for supporting said work object rotatably supported in said bearing means and including a work holding member and an angle measuring member located on the same side of all supporting bearing means of said base, one of said members rotatably supporting the other of said members in a manner to limit both said members to rotary movement relative to said base about a common axis angularly displaced from perpendicular relation to said bottom of the base, and holding means releasably to fasten said work object in arbitrary positions on at least one of said members.

12. A measuring and layout device or the like for holding a work object in selectable differing positions relative to a support base, embodying the combination of, a rigid angular support frame including a horizontal base section on which said layout device can stably stand and an upright support wall at right angles to said base section, rotor bearing means in said support wall, a compound movable structure for supporting said work object rotatably supported in said bearing means including a work holding member and an angle measuring member both located on the opposite side of said upright wall from the main bulk of said base section, one of said members rotatably supporting the other of said members in a manner to limit both of said members to rotary movement relative to said wall about a common horizontal axis parallel with said base section, holding means to fasten said work object releasably in arbitrary positions on at least one of said members, and manually releasable fastening means located on the same side of said upright wall as said main bulk of the base section constructed and arranged to prevent relative movement between said members.

13. A measuring and layout device or the like for holding a work object in selectable differing positions relative to a support base, embodying the combination with a support base having a planar bottom on which said layout device is adapted stably to stand, rotor bearing means on said base, a compound movable structure for supporting said work object rotatably supported in said bearing means and including a work holding member and an angle measuring member located on the same side of all supporting bearing means of said base, one of said members rotatably supporting the other of said members in a manner to limit both said members to rotary movement relative to said base about a common axis parallel with said bottom of the base, and holding means releasably to fasten said work object in arbitrary positions on at least one of said members.

14. A measuring and layout device or the like for temporarily and firmly holding a work object in variable positions, embodying in combination, a support base having a planar bottom on which said device may stably stand, a rotatable measuring wheel, a rotatable face plate equipped to receive and fixedly hold a work object in arbitrary positions thereon, bearing means rotatably supporting said plate and wheel constructed and arranged to confine the same to rotary movement both relatively and in unison about a common axis angularly displaced from perpendicular relation to said bottom of said base, and means constructed and arranged to be operative independently of said base to fasten said plate releasably in fixed rotative relation to said wheel while said plate and wheel both remain free to be rotated in relation to said base.

15. A work piece measuring and testing fixture embodying in combination, a base having a planar bottom on which said fixture may stably stand including upright supporting structure, a measuring wheel equipped with angle measuring factors supported on said base structure in a manner to be adjustably rotated relative thereto about an axis angularly displaced from perpendicular relation to the plane of said bottom of the base, a face plate having instrumentalities to fasten a work piece in arbitrary positions thereagainst and supported on said base structure in a manner to be adjustably rotated about said axis relative to said measuring wheel and relative to said base structure, fastening means constructed and arranged releasably to restrain said measuring wheel from rotation relative to said base structure while permitting rotation of said face plate relative to said measuring wheel so that the work piece after being fastened to said face plate may be swung in unison therewith about said axis to a desired initial position, and additional fastening means independent of said base constructed and arranged releasably to restrain said face plate from rotation relative to said measuring wheel while permitting rotation of said measuring wheel to universal positions relative to said base structure so that the work piece and face plate may be swung in unison with said measuring wheel relative to said base structure and away from said initial position to selective extents determinable by the degree of rotary movement of said measuring wheel relative to said base.

16. A work holding fixture including a support structure containing a circular aperture bordered by an annular flange, and a compound face plate structure including a carrier plate larger than said aperture arranged face-to-face with said support structure and having a hollow trunnion carried by said carrier plate swiveled and retained in said aperture, and a work holding plate face-to-face with said carrier plate carrying a trunnion-like projection swiveled and retained within said hollow trunnion of the carrier plate.

17. A work holding fixture as defined in claim 16 in which the said trunnion-like projection carried by the said work holding plate is provided with an annular groove of T-shaped cross section, together with bolts having heads occupying said groove and connecting with the said hollow trunnion of the said carrier plate in a manner to releasably fix said trunnion-like projection to said hollow trunnion thereby to prevent rotation of said work holding plate relative to said carrier plate.

18. A work holding fixture embodying in combination, an angular support structure including a base wall and an upright wall containing a large circular aperture, a rotatable carrier structure having an annular peripheral groove occupied by a portion of said upright wall bordering upon said large aperture and containing a relatively smaller circular aperture, and a rotatable face plate structure having an annular peripheral groove occupied by a portion of said carrier bordering upon said smaller aperture.

19. Compound rotatable structure for holding a work piece at selective angles to be measured or operated upon, embodying in combination, an angle base having an apertured support wall said wall having conical and planar bearing surfaces on the front thereof and an annular thrust surface on the rear thereof, a carrier ring having conical and planar bearing surfaces on both the front and rear thereof, a face plate having conical and planar bearing surfaces on the rear thereof, means cooperative with said thrust surface to clamp said bearing surfaces on said angle base and on said carrier ring lockingly together, and additional means separately to clamp said bearing surfaces on said face plate and on said carrier ring lockingly together.

20. Compound rotatable structure as defined in claim 19, in which the said face plate, the said carrier ring and the said angle base wall are telescopically related and are subject to pressure producing contact one against another solely at said bearing surfaces when each of the said means exerts its clamping pressure.

21. In a measuring and layout fixture, the combination with an angle base, of a work supporting carrier having a vertical face and mounted on said base in a manner to be rotatably adjustable about a horizontal axis fixed in relation to said base, at least two sine plugs on said carrier projecting outward beyond said face at equal distances from said axis and spaced around said axis by an angle of ninety degrees, carrier orienting means transferable to and from a position engaging both with said base and with said carrier constructed and arranged thereby to lock the latter in only a particularly predetermined rotary position relative to the former, cooperative frictional pressure faces borne respectively by said carrier and by said base, and means to increase and decrease pressure between said faces for fastening said carrier and said base in selective universal rotary positions.

22. Clamping structure for releasably holding a work carrier in selective rotative positions relative to the support wall of a fixture base, embodying in combination with said carrier and wall, a rigid annular surface on the rear of said wall bordering a circular aperture therein, a rotatable and axially movable work carrier positioned to contact with the front surface of said wall, and a retaining disc at the rear of said wall fixedly secured to said work carrier and having a relatively flexible resilient section closely flanking said rigid annular wall surface, together with means to flex said resilient section relatively to said rigid section and toward said rigid annular wall surface in a manner to draw said work carrier tightly against said front surface of the support wall for fastening the former against rotation.

23. In a work tilting and holding fixture, a support base, a work carrier structure including a brake drum rotatably mounted on said base, a split brake band surrounding said drum, means to contract and expand said brake band, an adjustor screw mounted on said base in a manner both to be rotated upon its own axis and to be tilted relative to said base and having threaded engagement with said brake band for causing the latter to rotatively adjust said drum.

24. In a work tilting and holding fixture, a support base, a rotatable work carrier drum, a nut carried by said drum in a manner to revolve in unison therewith and to swivel axially in relation thereto, an adjustor screw having threaded engagement with said nut and disposed in tangential relation to said drum, and a block constructed and mounted on said base in a manner rotatably to support and afford axial thrust for said adjustor screw and at the same time permit the latter to tilt axially to accommodate revolving movement of said nut in unison with said drum.

25. In a work tilting and holding fixture, a support base, a rotatable work carrier drum, a split brake band surrounding said drum, a nut carried by said brake band in a manner to revolve in unison therewith and to swivel axially in relation thereto, an adjustor screw having threaded engagement with said nut and disposed in tangential relation to said drum, and a block constructed and mounted on said base in a manner rotatably to support and afford axial thrust for said adjustor screw and at the same time permit the latter to tilt axially to accommodate revolving movement of said nut in unison with said brake band and drum.

26. In a work tilting and holding fixture, a support base, a work carrying structure including a wheel-like clutch member rotatably mounted on said base, a floating clutch device, means selectively to make said device loose or fast with respect to said member, an adjustor screw mounted on said base in a manner both to be rotated upon its own axis and to be tilted relative to said base and having threaded engagement with said clutch device for causing the latter rotatively to adjust said work carrying structure.

27. In a work tilting and holding fixture, a support base, a rotatable work carrying structure including a member revolvable with the work, a nut carried by said member in a manner to swivel in relation thereto and to revolve in unison with the work in a circular path of travel removed from said work, an adjustor screw having threaded engagement with said nut and disposed in generally tangential relation to said circular path of nut travel, and a block constructed and mounted on said base in a manner rotatably to support and afford axial thrust for said adjustor screw and at the same time permit the latter to tilt axially to accommodate revolving movement of said nut in unison with said member.

28. In an angle measuring and layout fixture, the combination with a support wall, of a rotatable work carrying structure having a niche sunken in the exterior surface thereof, a hollow sine plug embedded in and projecting from said structure occupying said niche in a manner to afford room for a measuring implement to enter said niche and contact with the peripheral surface of said sine plug, and a locking plug slidably carried by said support wall in a manner to be inserted within and withdrawn from the hollow of said sine plug for fastening said structure in rotative relation to said wall.

29. In an angle measuring fixture, the combination with a rotatable work carrying structure having a niche sunken in the exterior surface thereof, of a sine plug carried by said structure and occupying said niche in a manner to afford room for a measuring implement to enter said niche and contact with the peripheral surface of said sine plug.

30. In an angle measuring and layout fixture the combination with a support wall presenting a round orientation hole, of a work carrying structure mounted to rotate about an axis normal to said wall in a manner to traverse a face of said wall in the neighborhood of said hole, at least one bushing embedded in said structure having one end opening through said structure toward said wall and having its opposite end projecting from said structure in a direction away from said wall, said bushing having internal and external cylindrical surfaces of constant diameter throughout its length thereby to serve at the same time as a sine plug and as an orientation socket, and a slidable plug having a cylindrical shank of constant diameter throughout its length occupying both said hole and the inside of said bushing simultaneously for staying said structure against rotary movement relative to said wall.

31. In an angle measuring and layout fixture, the combination defined in claim 30, in which a plurality of the said bushings are embedded in the said work carrying structure at equal distances from the said axis and spaced ninety degrees apart in their common path of travel about said axis.

32. In an angle measuring and layout fixture, the combination defined in claim 30, in which a plurality of the said bushings are embedded in the said work carrying structure at equal distances from the said axis and spaced ninety degrees apart in their common path of travel about said axis, together with niches in the face of said structure occupied by and sheltering the projecting ends of the said bushings respectively, said niches being contoured to admit the sensing finger of a measuring instrument into contact with the external cylindrical surface of said bushing in all rotary positions of said structure.

33. In an angle measuring and layout fixture, the combination with a support wall, of a rotatable work carrying structure, a rotor bearing having its axis fixedly located with respect to said wall pivotally supporting said structure thereon, a hollow sine plug embedded in and projecting from said structure at a predetermined radial distance from said bearing axis, and a locking plug carried by said support wall constrained to sliding movement endwise in a direction crosswise of said wall at a fixed location adapting said plug at times to be inserted within and withdrawn from the hollow of said sine plug for respectively fastening and freeing said structure in a predetermined fixed rotary position in relation to said wall.

34. In an angle measuring and layout fixture, the combination with a support wall, of a rotatable work carrying structure, a rotor bearing fixedly located with respect to said wall pivotally supporting said structure thereon, a sine plug embodying a cylindrical element partially embedded in said structure having one end projecting from the latter and having an opposite hollow end facing and exposed to said support wall, and a locking plug carried by said support wall constrained for sliding movement endwise in a direction crosswise of said wall at a fixed location adapting said plug at times to be inserted within and withdrawn from the hollow end of said sine plug for respectively fastening and freeing said structure in a predetermined fixed rotary position in relation to said wall.

35. In a work holding fixture, a supporting base structure comprising in combination, a work supporting wall joined in fixed perpendicular relationship to a base wall, each of said walls terminating in a free edge extending from side to side of said structure, a rigid bail-shaped handle bridging said wall edges midway between the sides of said structure, and means providing planar rest surfaces so disposed on said structure and on said handle that the fixture may rest and stably support work on the first said wall when the latter is either vertical or horizontal.

36. In a work holding fixture, a supporting base structure comprising in combination, a work supporting wall joined in fixed perpendicular relationship to a base wall, each of said walls terminating in a free edge extending from side to side of said structure, a rigid bail-shaped handle bridging said wall edges midway between the sides of said structure, and means providing planar rest surfaces so disposed on said structure and on said handle that the fixture may rest and stably support work on the first said wall when the latter is either vertical or horizontal, said means including at least one rest surface on said handle substantially spaced from either of said terminal wall edges.

37. In a work holding fixture, a supporting base structure comprising in combination, a work supporting wall joined in fixed perpendicular relationship to a base wall, each of said walls terminating in a free edge extending from side to side of said structure, a rigid bail-shaped handle bridging said wall edges midway between the sides of said structure, and means providing planar rest surfaces so disposed on said structure and on said handle that the fixture may rest and stably support work on the first said wall when the latter is either vertical or horizontal, said means including at least two rest surfaces at said terminal edge of the base wall, and at least one rest surface on said handle substantially spaced from the said base wall edge thereby to give stable three point support to said fixture when said work supporting wall is horizontal.

OTTO E. SORENSEN.

CERTIFICATE OF CORRECTION.

Patent No. 2,345,312. March 28, 1944.

OTTO E. SORENSEN.

It is hereby certified that error appears in the printed specification of the above numbered patent requiring correction as follows: Page 5, second column, line 57, claim 11, and page 6, first column, line 28, claim 13, after "stand" and before the comma insert --of--; and that the said Letters Patent should be read with this correction therein that the same may conform to the record of the case in the Patent Office.

Signed and sealed this 4th day of July, A. D. 1944.

Leslie Frazer

(Seal) Acting Commissioner of Patents.